(12) United States Patent
Jeong et al.

(10) Patent No.: US 9,115,801 B2
(45) Date of Patent: Aug. 25, 2015

(54) SHIFT MANIPULATION STATE RECOGNIZING METHOD FOR SHIFT MANIPULATION APPARATUS

(71) Applicants: Hyundai Motor Company, Seoul (KR); SL Corporation, Daegu (KR)

(72) Inventors: Won Jin Jeong, Hwaseong-si (KR); Deok Ki Kim, Hwaseong-si (KR); Ki Nyeong Ko, Gyeongsan-si (KR); Man Young Cheon, Gyeongsan-si (KR); Won Hun Jung, Gyeongsan-si (KR)

(73) Assignees: HYUNDAI MOTOR COMPANY, Seoul (KR); SL CORPORATION, Daegu (KR)

( * ) Notice: Subject to any disclaimer, the term of this patent is extended or adjusted under 35 U.S.C. 154(b) by 61 days.

(21) Appl. No.: 14/105,003

(22) Filed: Dec. 12, 2013

(65) Prior Publication Data

US 2015/0107391 A1   Apr. 23, 2015

(30) Foreign Application Priority Data

Oct. 22, 2013   (KR) .................. 10-2013-0125875

(51) Int. Cl.
  *G06F 17/00* (2006.01)
  *F16H 59/10* (2006.01)
  *F16H 59/08* (2006.01)

(52) U.S. Cl.
  CPC ........ *F16H 59/105* (2013.01); *F16H 2059/082* (2013.01)

(58) Field of Classification Search
  None
  See application file for complete search history.

(56) References Cited

U.S. PATENT DOCUMENTS 8,224,512 B1 *   7/2012   Dengel et al. .................. 701/21
8,930,100 B2 *   1/2015   Minase et al. .................. 701/54

FOREIGN PATENT DOCUMENTS

| JP | 10-230758 A | 9/1998 |
| JP | 5123978 B2 | 1/2013 |
| KR | 10-2002-0030363 A | 4/2002 |
| KR | 10-0369545 B1 | 3/2003 |
| KR | 100510351 B1 | 8/2005 |
| KR | 10-2008-0049400 A | 6/2008 |
| KR | 1020110062888 A | 6/2011 |
| KR | 1020130035145 A | 4/2013 |
| KR | 10-1295007 B1 | 8/2013 |
| KR | 10195007 B1 | 8/2013 |

* cited by examiner

*Primary Examiner* — Dirk Wright
(74) *Attorney, Agent, or Firm* — Morgan, Lewis & Bockius LLP

(57) ABSTRACT

A stable operation performance of a shift operation apparatus is ensured by allowing the shift lever to be stably recognized using a specific shift stage even in the case where the shift lever has stopped ambiguously between the two neighboring shift stages, and to exactly recognize by judging more exactly which one of the other shift stages, such as + stage and N stage, has been selected even in the case where sensor errors of a sensor for sensing whether the M stage or a manual mode has been selected occur.

5 Claims, 5 Drawing Sheets

*FIG. 6*

| RECOGNIZED SHIFT STAGE | SHIFT LEVER STOP POSITION | |
|---|---|---|
| | P → D DIRECTION | D → P DIRECTION |
| P | P + a | P |
| R | R + b | R + a |
| N | N + c | N + b |
| D | D | D + c |

SHIFT MANIPULATION STATE RECOGNIZING METHOD FOR SHIFT MANIPULATION APPARATUS

CROSS-REFERENCE TO RELATED APPLICATION

The present application claims priority of Korean Patent Application Number 10-2013-0125875 filed Oct. 22, 2013, the entire contents of which application is incorporated herein for all purposes by this reference.

BACKGROUND OF INVENTION

1. Field of Invention

The present invention relates to a shift state recognizing method for a shift manipulation apparatus, and more particularly, to a technology for recognizing a shift manipulation state more stably in a shift manipulation apparatus configured to select the shift stages depending on the locations of shift levers.

2. Description of Related Art

FIG. 1 is a view illustrating a shift manipulation apparatus to which the present invention is applied wherein a driver may select P, R, N, D stages and M, +, − as a manual mode by moving a shift lever 500.

In the conventional shift manipulation apparatus as described above, a principle of recognizing of a shift stage selected by users is conceptually shown in FIG. 2. That is, P-R-N-D stages, as shown in FIG. 2, are arranged sequentially in the respective valleys of route provided with a plurality of bending, and when a shift lever stops in a valley where any shift stage is positioned while moving along with the bending, the shift stage positioned in the valley is recognized as being selected by user.

Here, the route provided with a plurality of bending conceptually represents an operation of detent structure which is constituted for the shift lever to be exactly stopped at a specific shift stage while moving substantially between the respective shift stages.

That is, when stopping the shift lever, in order for the shift lever to be more exactly positioned in a specific location where the respective shift stages are allotted, an operation of detent structure which is configured to form a moderation feeling using elastic members, etc. is conceptually illustrated with a curved line in FIG. 2.

However, during an operation to select any one shift stage by moving the shift lever, it cannot rule out a case that the shift lever sometimes stops on the peak between valleys. That is caused by the frictional force or mechanical structure of detent device and therefore, when such a phenomenon occurs, a controller for realizing a driver's intention to shift gears by recognizing the operation state of the shift manipulation apparatus is placed in a difficult situation in judging the driver's exact intention of shift gears.

That is, in case where the shift lever stops on the peak located between the R and N stages of FIG. 2 while moving, the controller is in an ambiguous situation in determining which shift lever the driver has selected.

Meanwhile, in the shift manipulation apparatus as mentioned above, the movement of the shift lever along the P-R-N-D section is detected by a rotary sensor interlocked with the shift lever, and whether to select the M stage is detected by a magnet sensor provided separately and thus, when a value of the rotary sensor moves + stage or − stage while a magnetic flux strength is in a predetermined level or more, a controller recognizes that the driver has selected + stage or − stage on the manual mode.

However, in the shift manipulation apparatus as configured above, under the circumstances of being unable to detect that the driver has selected the M stage for various reasons such as that the magnetic sensor is damaged or deviated from its regular course, etc., the sensing locations of the + stage and N stage are very closely located with each other considering the values sensed from the rotary sensor, and thus it becomes difficult to distinguish whether the shift lever has selected + stage or N stage by a controller alone.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to solve the above-described problems associated with prior art.

Various aspects of the present invention provide for a shift state recognizing method for a shift manipulation apparatus, which is configured to ensure a more stable operation performance of the shift operation apparatus by allowing the shift lever to be stably recognized using a specific shift stage even in the case where the shift lever has stopped ambiguously between the two neighboring shift stages, and to exactly recognize by judging more exactly which one of the other shift stages, such as + stage and N stage, has been selected even in the case where sensor errors of a sensor sensing whether the M stage, a manual mode has been selected occur.

Various aspects of the present invention provide for a shift manipulation state recognition method of a shift manipulation apparatus including: a movement sensing step to sense the movement of a shift lever; a direction sensing step to sense the movement direction of the shift lever; a stop position determination step to determine whether the stop position of the shift lever is within a predetermined overlap section when the shift lever stops; and a first shift recognizing step to determine that the shift stage just before the overlap section where the shift lever is stopped, along the sensed movement direction of the shift lever at the direction sensing stage, is selected when the stop position of the shift lever is within the overlap section as a result of performing the stop position determination stage.

Various aspects of the present invention provide for a shift manipulation state recognition method of a shift manipulation apparatus to recognize which shift stage has been selected by the shift lever among a plurality of shift stages arranged in sequence on a moving path of the shift lever is featured that when the shift lever has stopped between the two neighboring shift stages and thus it is necessary to determine which shift stage has been selected, it is recognized that the shift stage through which the shift lever has passed just before the shift lever stops, along with the direction of movement of the shift lever, has been selected.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a table illustrating a recognizing method for a shift manipulation state according to the present invention.

Figure 1:
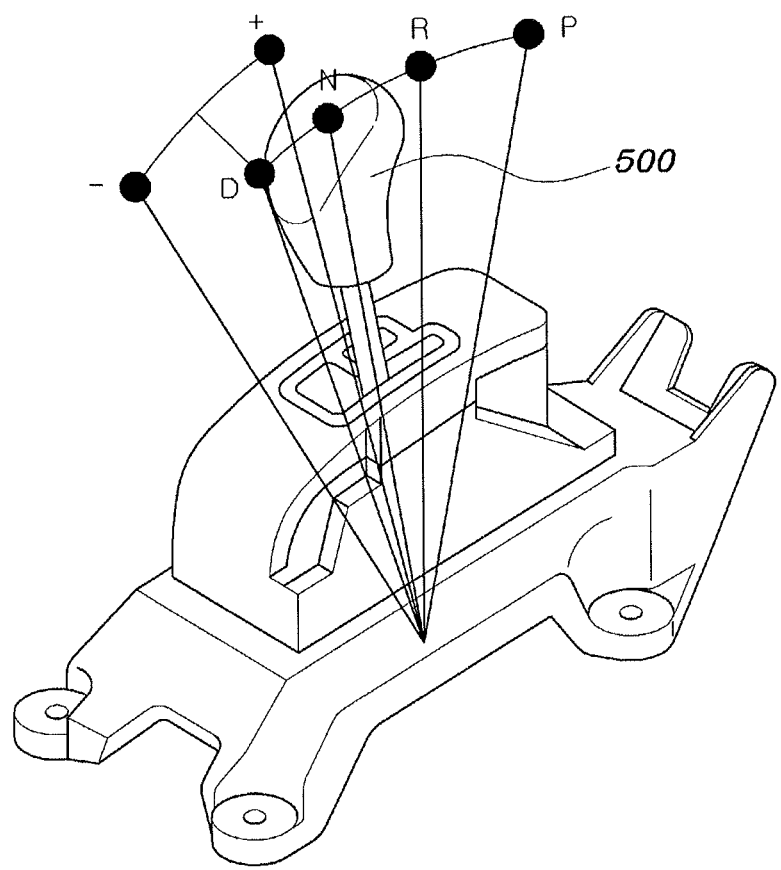
FIG. 1 is a perspective view illustrating an exemplary shift manipulation apparatus to which the present invention can be applied and the shift stages to be selected by the apparatus.
Figure 2:
FIG. 2 is a perspective view conceptually illustrating a principle of recognizing a shift stage selected in the shift manipulation apparatus of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
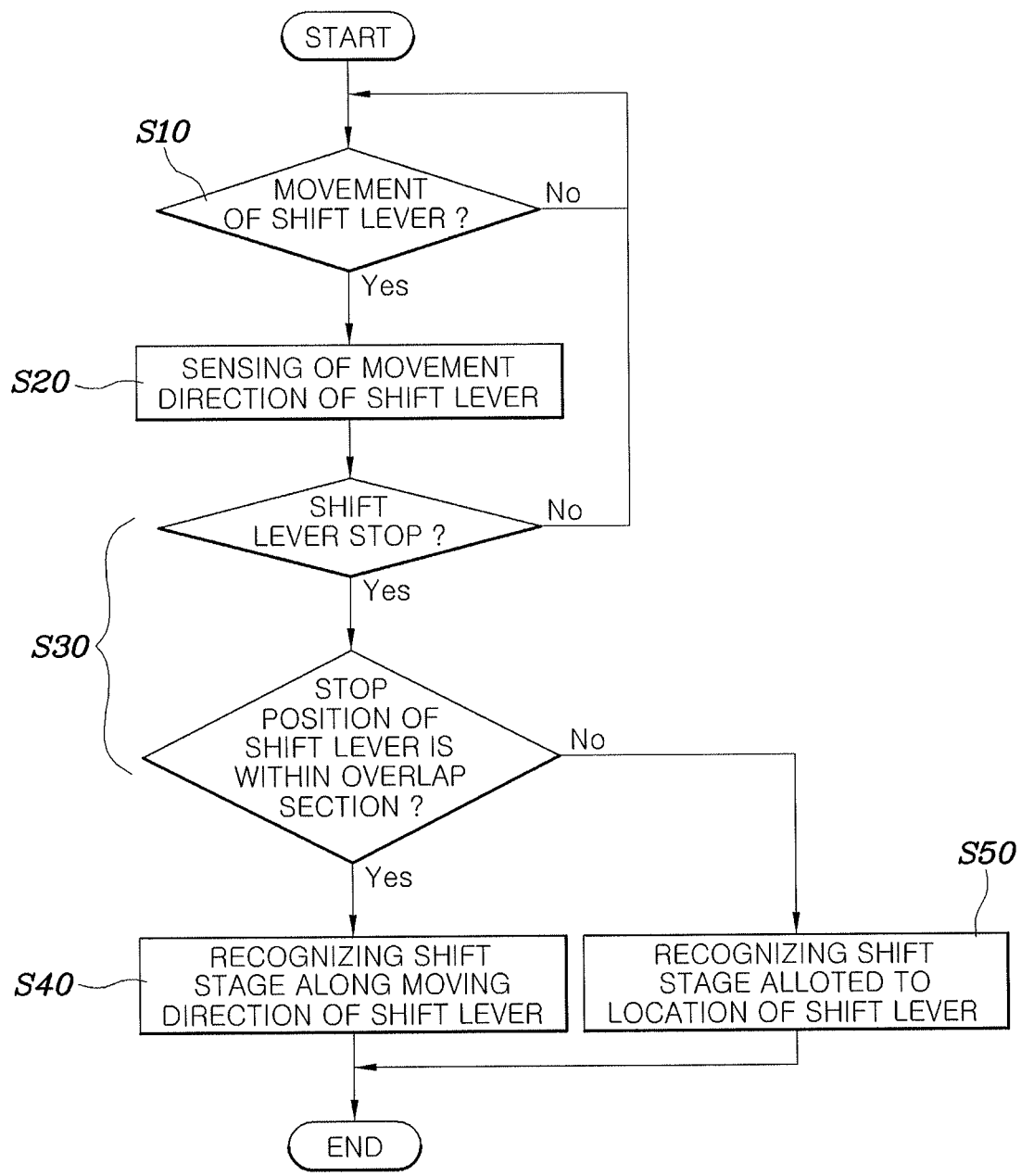
FIG. 3 is a flow chart illustrating an exemplary recognizing method for a shift manipulation state in the shift manipulation apparatus according to the present invention.

Referring to FIG. 3, various embodiments of a recognizing method for a shift manipulation state of a shift manipulation apparatus of the present invention includes a controller, such as a central processor unit (CPU) or other suitable means, that performs: a movement sensing step S10 to sense the movement of a shift lever; a direction sensing step S20 to sense the movement direction of the shift lever; a stop position determination step S30 to determine whether the stop position of the shift lever is within a predetermined overlap section when the shift lever stops; and a first shift recognizing step S40 to determine that the shift stage just before the overlap section where the shift lever is stopped, along the sensed movement direction of the shift lever at the direction sensing stage S20, is selected when the stop position of the shift lever is within the overlap section as a result of performing the stop position determination stage S30.

In addition, the recognizing method for a shift manipulation state includes a second shift stage recognizing stage S50 to recognize the shift stage allotted to the corresponding position as being selected, when the stop position is located beyond the overlap section as a result of performing the stop position determination stage S30.

That is, in a method for recognizing which shift stage has been selected by the shift lever among a plurality of shift stages arranged in sequence on a moving path of the shift lever, when the shift lever has stopped between the two neighboring shift stages and thus it is necessary to determine which shift stage has been selected, it is recognized that the shift stage through which the shift lever has passed just before the shift lever stops, along with the direction of movement of the shift lever, has been selected. If not, however, the selected shift stage is recognized as it is.

Of course, the recognizing method as mentioned above is performed by a separate controller which controls the transmission by sensing the manipulation state of a shift manipulation apparatus.

The movement direction of the shift lever sensed at the direction sensing step S20 is set in two directions facing each other, to which shift lever can move along with the shift stages allotted in a row to be selected in sequence along with the movement of the shift lever.

Figure 4:
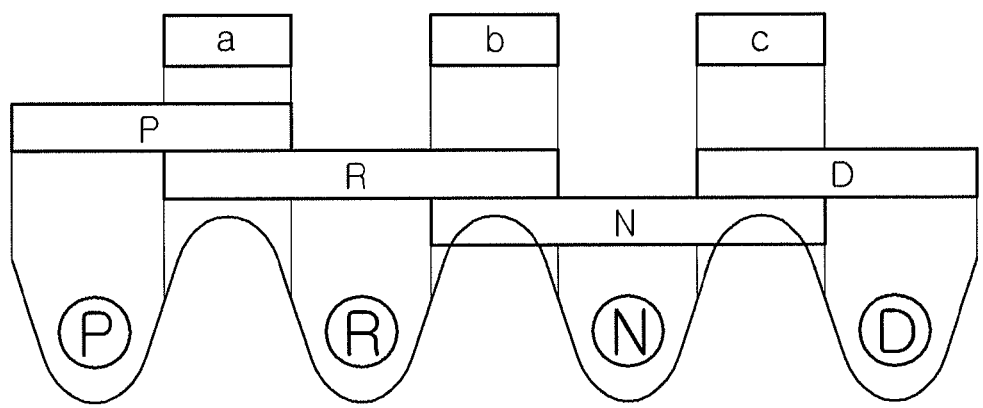
FIG. 4 is a perspective view to illustrate conceptually a recognizing method for a shift manipulation state according to the present invention as compared with FIG. 2.

That is, as shown in FIG. 4, the shift lever can move along a direction toward D stage at the other side from P stage at one side, and on the contrary to this, it can move along the direction toward P stage from D stage and therefore, it has been sensed and recognized one direction of the two directions, to which the shift lever moves, at the direction sensing stage S20 and then it is utilized at the first shift recognizing stage S40.

For reference, when the shift stage is recognized in accordance with the stop position of the shift lever, it is arranged in FIG. 6 regarding which shift stage is recognized as being selected along with the two directions as stated above.

The overlap section is set with the maximum scope where there is a possibility that the shift lever is maintained in a stopped state between the two neighboring shift stages due to mechanical causes.

That is, the section where there is a possibility of the shift lever to be maintained in a stopped state is set to be the overlap section, resulted from a plurality of experiment or interpretation, etc., while a driver stops to operate the shift lever due to an abnormal operation of the detent device or the mechanical friction of the shift lever, etc.

For example, an overlap section between P stage and R stage is indicated as a, and an overlap section between P stage and N stage is indicated as b, and an overlap section in N stage and D stage is indicated as c in FIG. 4. Meanwhile, in FIG. 5, such a relationship is indicated in a shift pattern indicated in the two dimensions.

The controller recognizes that the corresponding shift stage has been selected by a second shift stage recognition stage S50, when the position where a driver stopped the shift lever while the driver moves the shift lever is beyond the overlap section, that is, is an exact position to which the respective shift stage is allotted.

For example, when the shift lever located in the valley allotted as P stage among the curves lines of FIG. 4 moves and locates exactly at the valley allotted as R R stage, not at an overlap section a, a controller recognizes that the driver has selected R stage.

However, if the shift lever is stopped within an overlap section a between P stage and R stage in the stopped state, the controller recognizes that P stage is selected as it is by the first shift stage recognizing stage S40.

That is, considering the movement direction of the sensed at the direction sensing stage S20, since the shift lever was moving in the direction toward D stage from P stage, it recognizes that P stage, which is a shift stage just before an overlap section a where the shift lever is currently stopped, has been selected at a first shift stage recognizing step S40.

When the shift lever is stopped at an overlap section b while moving in the same direction as mentioned above, a controller recognizes that R stage, which is the shift stage just before the overlap section b, has been selected, and when the shift lever is stopped at an overlap section c while moving in the same direction as well, the controller recognizes that N stages has been selected.

On the contrary, for example, when the shift lever is stopped at the overlap section c while moving toward the direction to P stage from D stage, the controller recognizes that the D stage has been selected as it is; when the shift lever is stopped at the overlap section b, the controller recognizes that the N stage has been selected; and when the shift lever is stopped at the overlap section a, the controller recognizes that the R stage has been selected.

Through this method as described above, the selected state of the shift stage with respect to a temporary location of the shift lever can be recognized consistently, and thus the stable recognition of the shift stage may always be possible deviating from obscurity of the shift stage selection, even when the shift lever is stopped at any positions.

In addition, in the case where the state of the shift stage selection can be recognized in the same way as mentioned above, it can be determined surely and recognized that anyone of other shift stages such as + stage and N stage has been selected, even when the magnet sensor sensing for sensing whether the M stage of an manual mode has been selected has an error.

Figure 5:
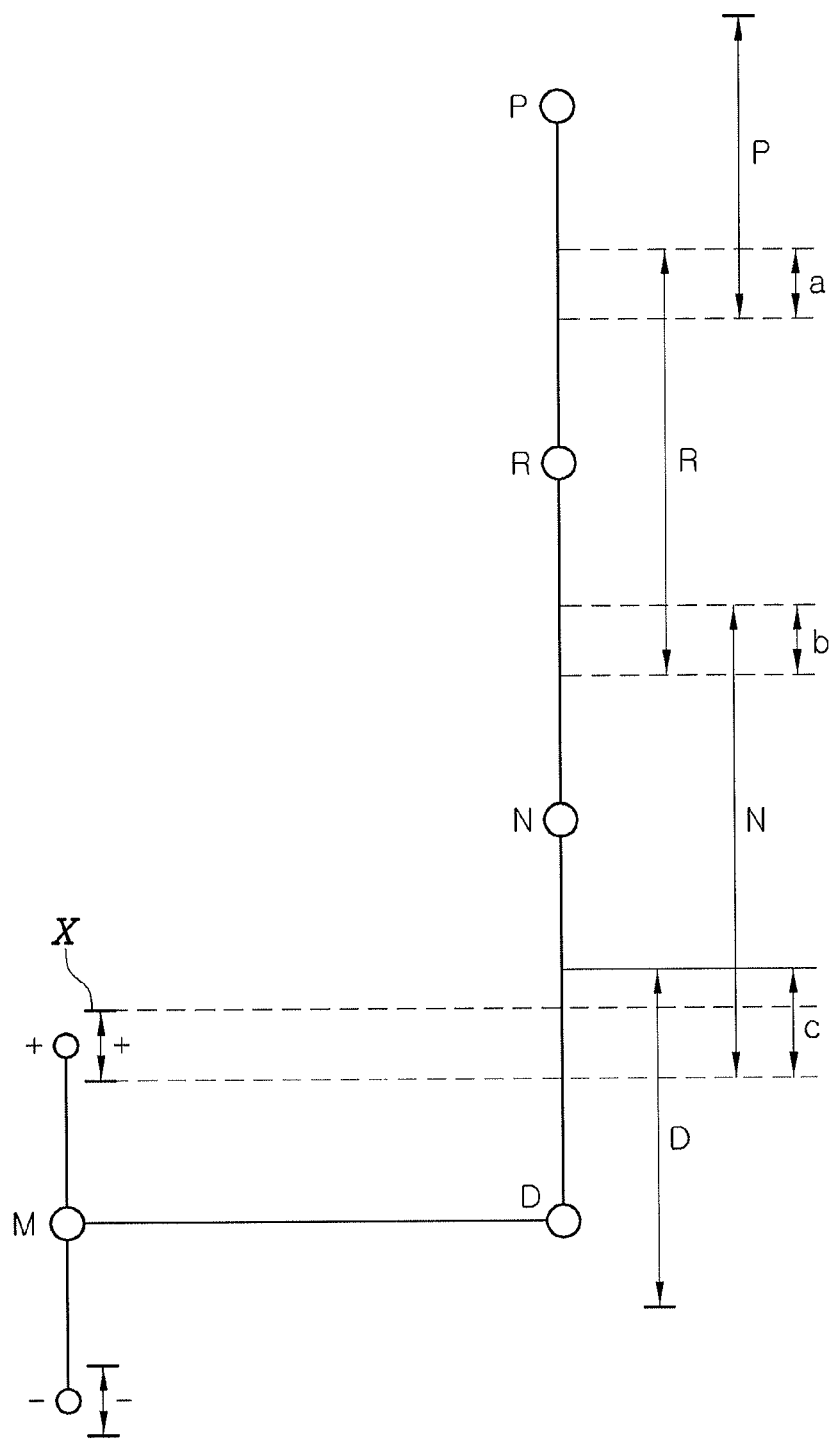
FIG. 5 is a concept view illustrating a recognizing method for a shift manipulation state according to the present invention.

That is, referring to FIG. 5, the vertical position of the + stage and the N stage is considerably situated close to each other as compared to other shift stages and therefore, it may be difficult to exactly recognize whether the shift lever has selected N stage or + stage in case where the magnet sensor does not normally operate due to a failure, etc.

However, when applied to the present invention, in case where the shift lever moves toward the direction to which the shift lever selects the N stage from the D stage, the controller recognizes that the shift lever has selected the D stage only when it has completely passed to the overlap section c between D stage and N stage and therefore, even if the magnet sensor has been failed, when the shift lever selects the + stage at the M stage, since the maximum value X of the + stage area, through which it is determined to have selected the + stage, is not deviated from the overlap section c, as shown in FIG. 5, it can be recognized that the N stage has not been selected. At this time, even if the magnet sensor is failed, since a separate sensor signal with respect to the selection of the + stage is inputted, it can recognize that the + stage of the manual section has been selected based on that the sensor signal and the position where the shift lever do not deviate the overlap section c.

According to the present invention, a more stable operation performance of the shift operation apparatus is ensured by allowing the shift lever to be stably recognized using a specific shift stage even in the case where the shift lever has stopped ambiguously between the two neighboring shift stages, and to exactly recognize by judging more exactly which one of the other shift stages, such as + stage and N stage, has been selected even in the case where sensor errors of a sensor for sensing whether the M stage or a manual mode has been selected occur.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A shift manipulation state recognition method comprising:
    a movement sensing step, performed by a shift manipulation apparatus, to sense the movement of a shift lever;
    a direction sensing step, performed by the shift manipulation apparatus, to sense the movement direction of the shift lever;
    a stop position determination step, performed by the shift manipulation apparatus, to determine whether the stop position of the shift lever is within a predetermined overlap section when the shift lever stops; and
    a first shift recognizing step, performed by the shift manipulation apparatus, to determine that the shift stage just before the overlap section where the shift lever is stopped, along the sensed movement direction of the shift lever at the direction sensing stage, is selected when the stop position of the shift lever is within the overlap section as a result of performing the stop position determination stage.

2. The shift manipulation state recognition method of a shift manipulation apparatus of claim 1, further comprising a second shift stage recognizing stage to recognize the shift stage allotted to the corresponding position as being selected, when the stop position is located beyond the overlap section as a result of performing the stop position determination stage.

3. The shift manipulation state recognition method of a shift manipulation apparatus of claim 1, wherein the movement direction of the shift lever sensed at the direction sensing step is set in two directions facing each other, to which shift lever moves along with the shift stages allotted in a row to be selected in sequence along with the movement of the shift lever.

4. The shift manipulation state recognition method of a shift manipulation apparatus of claim 1, wherein the overlap section is set with the maximum scope where there is a possibility that the shift lever is maintained in a stopped state between the two neighboring shift stages due to mechanical causes.

5. A shift manipulation state recognition method to recognize which shift stage has been selected by a shift lever among a plurality of shift stages arranged in sequence on a moving path of the shift lever, wherein when the shift lever has stopped between the two neighboring shift stages and thus it is necessary to determine which shift stage has been selected, a shift manipulation apparatus recognizes that the shift stage through which the shift lever has passed just before the shift lever stops, along with the direction of movement of the shift lever, has been selected.

* * * * *